United States Patent
Coulonvaux

[19]
[11] Patent Number: 6,051,042
[45] Date of Patent: *Apr. 18, 2000

[54] AIR CLEANER ASSEMBLY

[75] Inventor: Paul R. Coulonvaux, Brussels, Belgium

[73] Assignee: Donaldson Company, Inc., Minneapolis, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/928,684

[22] Filed: Sep. 12, 1997

[51] Int. Cl.⁷ .................................................. B01D 46/24
[52] U.S. Cl. .............................. 55/498; 55/502; 55/503; 55/504
[58] Field of Search ............................ 55/498, 502, 503, 55/504

[56] References Cited

U.S. PATENT DOCUMENTS

| | | |
|---|---|---|
| 1,423,412 | 7/1922 | Garner . |
| 2,675,886 | 4/1954 | McMullen . |
| 3,130,025 | 4/1964 | Bowden et al. ............................ 55/503 |
| 3,218,785 | 11/1965 | Tietz ......................................... 55/503 |
| 3,357,163 | 12/1967 | Burger et al. .............................. 55/504 |
| 3,423,909 | 1/1969 | Bennett et al. ............................ 55/498 |
| 3,584,439 | 6/1971 | Gronholz ................................... 55/498 |
| 3,616,618 | 11/1971 | Gronholz et al. ......................... 55/498 |
| 3,672,130 | 6/1972 | Sullivan et al. ........................... 55/498 |
| 4,006,000 | 2/1977 | Tortorici et al. .......................... 55/503 |
| 4,017,100 | 4/1977 | Gehrig et al. ............................. 280/736 |
| 4,130,405 | 12/1978 | Akado et al. .............................. 55/503 |
| 4,135,899 | 1/1979 | Gauer ........................................ 55/482 |
| 4,148,732 | 4/1979 | Burrow et al. ........................... 210/232 |
| 4,211,543 | 7/1980 | Tokar et al. .............................. 55/485 |
| 4,217,121 | 8/1980 | Fichter ..................................... 55/478 |
| 4,261,710 | 4/1981 | Sullivan ................................... 55/502 |
| 4,278,455 | 7/1981 | Nardi ........................................ 55/337 |
| 4,312,651 | 1/1982 | Esaki et al. .............................. 55/502 |
| 4,333,580 | 6/1982 | Sweigart, Jr. . |
| 4,491,460 | 1/1985 | Tokar ....................................... 55/337 |
| 4,493,717 | 1/1985 | Berger, Jr. et al. ....................... 55/330 |
| 4,501,376 | 2/1985 | Bushby . |
| 4,632,682 | 12/1986 | Erdmannsdörfer ....................... 55/498 |
| 4,637,919 | 1/1987 | Ryder et al. ............................ 422/300 |
| 4,950,317 | 8/1990 | Dottermans .............................. 55/498 |
| 5,120,337 | 6/1992 | Benzler et al. .......................... 55/498 |
| 5,171,342 | 12/1992 | Trefz ........................................ 55/498 |
| 5,391,212 | 2/1995 | Ernst et al. ............................ 55/385.3 |
| 5,545,241 | 8/1996 | Vanderauwera et al. ................ 55/490 |
| 5,547,480 | 8/1996 | Coulonvaux ............................. 55/498 |
| 5,605,654 | 2/1997 | Hsieh et al. ........................... 261/79.2 |
| 5,649,986 | 7/1997 | Mueller .................................... 55/276 |
| 5,676,273 | 10/1997 | Jonkers et al. . |
| 5,688,299 | 11/1997 | Goodwin ............................... 55/385.3 |
| 5,706,777 | 1/1998 | Schlessmann et al. ............. 123/198 E |
| 5,730,769 | 3/1998 | Dungs et al. ............................ 55/498 |
| 5,755,842 | 5/1998 | Patel et al. ............................... 55/502 |

FOREIGN PATENT DOCUMENTS

| | | |
|---|---|---|
| 0 562 502 A1 | 9/1993 | European Pat. Off. . |
| 0 634 203 A3 | 1/1995 | European Pat. Off. . |
| 0 329 659 B1 | 4/1995 | European Pat. Off. . |
| 25 20 099 | 11/1976 | Germany . |
| 33 336 882 A1 | 5/1985 | Germany . |
| 43 32 559 A1 | 3/1995 | Germany . |
| 93/9129 | 8/1994 | South Africa . |
| 1 563 649 | 3/1980 | United Kingdom . |
| 2 035 832 | 6/1980 | United Kingdom . |
| 94/13389 | 6/1994 | WIPO ..................................... 55/502 |

OTHER PUBLICATIONS

Declaration of Stan Koehler with Exhibit A, 7 pages.

*Primary Examiner*—Duane S. Smith
*Attorney, Agent, or Firm*—Merchant, Gould, Smith, Edell, Welter & Schmidt, P.A.

[57] ABSTRACT

An air cleaner assembly having a body member and a removable cover is provided. The assembly includes a lock assembly for engagement between the cover and the body member. The preferred lock assembly is a rotation activated lock assembly movable between locked and unlocked orientations by a selected amount of relative rotational movement between the cover and the body member.

20 Claims, 11 Drawing Sheets

AIR CLEANER ASSEMBLY

FIELD OF THE INVENTION

The present application relates to air cleaners. It particularly concerns air cleaners having a housing comprising two sections which, together, enclose an air filter element. The invention concerns a preferred arrangement for securing two housing sections to one another. The invention also concerns methods of assembly and use.

BACKGROUND OF THE INVENTION

Air cleaner assemblies are widely utilized in connection with intake air flow, for example to internal combustion engines. Air cleaners are used on such equipment as: heavy duty trucks; construction equipment, (for example, graders, bulldozers, and backhoes); agricultural equipment (for example, tractors and combines); off-road vehicles; buses; light duty trucks; automobiles; special equipment (for example, forklifts and loaders); and other types of equipment (for example, lawn tractors). The engines for such systems generally use an air cleaner, which may vary in size and capacity, depending on the system. For systems generally utilizing an 8-inch air cleaner, the engines are typically about 5 liters and have a horse power of typically about 100 hp.

A purpose of the air cleaner, in such systems, is generally to filter incoming air to the engine, in order to protect engine parts from damage. In general, the air cleaners comprise housings having removable and replaceable filter elements positioned therein. The filter elements in many systems have generally circular or cylindrical configurations and are operated in a "forward flow" manner; i.e., with filtering flow from an exterior of the element to an interior. For equipment of the type described above, often the air flow rates through the air cleaners are the order of about 30 to 350 CFM (cubic feet per minute) (about 0.8–10 cubic meters per minute), depending on whether the engines are idling or under load. To accommodate the desired filter lifetime, filter efficiency needs and space limitations, generally filter element diameters on the order of 3.0 to 8.5 inches (about 75–210 mm) are commonly used with such equipment. Such filter elements generally weigh from 200 grams to 1200 grams new (clean), and can gain in weight by up to 3 times or more during use. Air cleaner housings having diameters of at least 4 to 10 inches (about 100–1000 mm), and lengths of 7.5 to 24 inches (about 100–600 mm), for such equipment, are relatively common. It is for use with such air cleaners as the ones described in this and the previous paragraph that arrangements according to the present invention were particularly developed. That is, the invention is particularly suitable for such systems, although it may be applied to others.

Air cleaners of the type described in the previous two paragraphs are regularly and routinely serviced. In some instances, air filter elements are removed and are either cleaned or replaced. Also, in some instances the interior chamber of the air cleaner is cleaned of materials such as leaves, settled dust, etc. To facilitate installation and servicing, air cleaner arrangements are constructed so that they can be opened and elements can be installed and removed.

Typically, to facilitate assembly and service, air cleaner housings are constructed in two major portions: a main body member section; and, a cover. Generally, the cover is non-threadably mounted on the body section, to enclose the air cleaner body. A variety of arrangements have been used to secure the cover to the housing, in air cleaners of the type characterized above, including, for example: bolt systems; metal latches; and plastic latch arrangements.

SUMMARY OF THE INVENTION

According to the present invention, an air cleaner assembly is provided. The air cleaner assembly generally includes a body member and a removable cover. The assembly includes a lock assembly for selectively securing the removable cover to the body member. The preferred lock assembly is rotation activated. That is, the cover is secured in engagement with the body member, and is released from engagement, based upon selected rotational movement of the cover, relative to the body member. For the preferred arrangement, the lock assembly is constructed so that movement between locked and unlocked orientations occurs with relatively little rotational movement, on the order of only about 5° to 25°.

Preferred lock assemblies according to the present invention are positioned such that no portion of them is directly "exposed" to the exterior environment when the system is engaged, i.e., when the cover is locked onto the body member. By this, it is meant that when the cover is locked onto the body member, the portions which comprise the lock assembly are positioned underneath the cover, and are not directly exposed to the exterior environment or elements. Thus, the housing preferably includes no apertures therein oriented over the lock assembly. This means, inter alia, that snow, ice, road tar, mud, etc. will be less likely to interfere with the smooth operation of the locking assembly. Herein, when the term "internal lock assembly" is used, it is meant that the lock assembly is positioned or contained under a protective outer surface or outer surfaces of the housing, having no apertures therein, when the lock assembly is assembled and locked. The term "internal" when used in this context refers to protection under any portion of the cover and/or body member, as long as direct external exposure, through an aperture or otherwise, is not involved.

For typical applications, the body member defines an open air cleaner interior and includes an air flow inlet. Typically, the air flow inlet will be a side inlet, although alternatives are usable. The body member generally includes a sidewall and an endwall. The sidewall is sized to receive at least a portion of a removable and replaceable air filter element therein, during use. The insertion of the air filter element, into the body member, is through an open end defined by the sidewall.

Typical air cleaner arrangements include an air flow outlet through which filtered air flows from the air cleaner in its path to downstream equipment such as a vehicle engine. The air flow outlet may comprise a piece snap fit to a remainder of the body member; or, it may be constructed integral with the body member.

In a preferred arrangement as described and shown, the rotation activated lock assembly comprises a lug-and-socket or foot-and-holder lock arrangement, including a socket or foot arrangement and a lug or holder arrangement. The socket or foot arrangement is mounted on a first one of the body member and cover; and, the lug or holder arrangement is mounted on a second one of the body member and cover. The socket or foot arrangement and the lug or holder arrangement are arranged such that, during locking, portions of the socket or foot arrangement are secured in place by portions of the lug or holder arrangement. The preferred arrangement is such that, upon rotation to the unlocked orientation, disengagement between those portions of the socket or foot arrangement and the lug or holder arrangement occurs.

In preferred assemblies, the socket or foot arrangement comprises a plurality of L-shaped feet or foot members (i.e. sockets) positioned on the cover; and, the lug or holder arrangement comprises a plurality of holders (or lugs) positioned on the body member. Preferably, the L-shaped foot members (sockets) are evenly, radially, spaced; and, the holders (lugs) are also evenly radially spaced.

Preferred configurations for the holders (lugs) and L-shaped feet (sockets), to accommodate convenient locking, convenient unlocking, and convenient manufacture are provided. To facilitate locking, the configuration of the holders (lugs) is selected such that each holder (lug) has a pair of spaced projections thereon defining a recessed, concave or slot portion which receives, in frictional engagement, a locking projection, bend or detent, during locking.

In preferred embodiments, the holders (lugs) rest and are trapped, over-center, in recesses in the feet (sockets). As such, the locking assembly in preferred embodiments operates as an "over-center" lock. By "over-center lock", it is meant a lock where the maximum torsion or bearing force occurs during relative passage over the center between the holders (lugs) and the feet (sockets), but is relieved on opposite sides of the center, i.e., in a locked, or unlocked, orientation.

In some embodiments, the body member and the cover can be configured to define an interior of size sufficient to operably receive a cylindrical filter element having a diameter of at least 6 inches.

According to the present invention, a method of securing a cover onto an air cleaner embodiment is provided. The method preferably involves orienting the cover in covering relation to an end of the body member; and, rotating the cover to the locked orientation. Preferably, the locked orientation is obtained by use of a preferred rotational oriented locking assembly as described herein; and, is a non-threaded arrangement.

In certain embodiments, an engagement finger assembly or construction is provided. The engagement finger construction includes a member slideable into a position that inhibits unlocking of the locking assembly, when selectively positioned.

DETAILED DESCRIPTION OF THE PREFERRED EMBODIMENT

Figure 1:
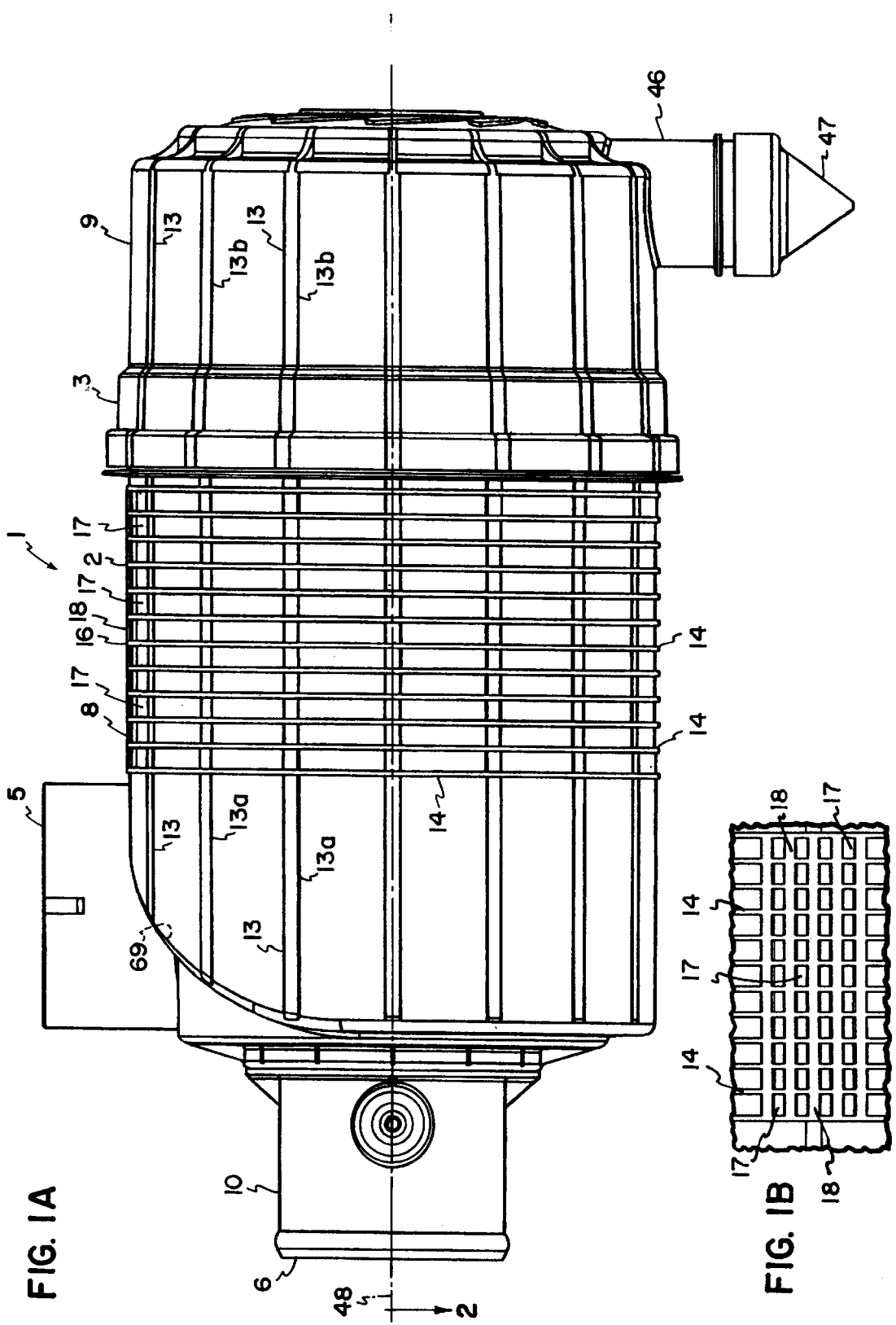
FIG. 1A is a front side elevational view of a first embodiment of a housing for an air cleaner, according to the present invention.
FIG. 1B is a fragmented, enlarged, top plan view of a portion of the housing of FIG. 1A used to receive a mounting bracket.

The principles of the present invention can be incorporated into air cleaners of a variety of sizes and configurations. In the accompanying figures, the principles are shown embodied in plastic arrangements having distinctive topical features. These distinctive topical features are the subjects of U.S. design patent disclosures filed on the same date as the present invention, namely, design application Ser. Nos. 29/076,523; 29/076,662; and 29/076,667, each filed on Sep. 12, 1997. Selected references to these distinctive features will also be made herein.

General Description

The reference numeral 1, FIG. 1A, indicates an air cleaner assembly according to the present invention. The air cleaner assembly 1, in FIG. 1A, is depicted in front side elevational view. The assembly 1 includes an exterior housing 2 defining an exterior 3 and interior 4 (FIG. 2). Air to be filtered enters the housing 2 through an inlet 5. Within the housing 2, the air is filtered. The air then passes outwardly through an outlet 6. The air is then directed to downstream equipment, for example, an engine.

Still referring to FIG. 1A, the housing 2 of the particular air cleaner assembly 1 depicted primarily comprises molded plastic components. In particular, the housing 2 comprises a molded plastic body member 8 and a molded plastic cover 9. Further, the outlet 6 comprises molded plastic outlet tube 10. As will be understood by further descriptions below, the outlet tube 10, for the particular arrangement shown, is snap fit into a portion of body member 8.

Principles of the present invention, described hereinbelow in detail, primarily concern the manner in which the cover 9 is secured to the body member 8. Before details concerning this are described, further overview discussion is presented.

Still referring to FIG. 1A, the exterior 3 of housing 2 includes: (a) certain distinctive topical features; and also, (b) other features primarily for facilitating function or operation. For example, housing 2 includes exterior ribs 13 thereon. The ribs 13 are axially aligned and extend across both the body member 8 and the cover 9. Ribs 13 primarily serve to provide a distinctive appearance. Note that the body member 8 and cover 9 are molded such that portions of ribs 13a and 13b thereon, respectively, align to provide ribs 13 of a continuous and distinctive appearance, when the cover 9 is properly positioned in locking and covering relation to body member 8, as shown in FIG. 1A.

Still referring to FIG. 1A, exterior surface 3 of the housing 2, in a portion which comprises body member 8, is provided with spaced radial ribs or rings 14. Although the number and spacing of the rings 14 is not critical, these rings 14 serve in part to strengthen the plastic body member 8 in regions where a mounting bracket, discussed below, for securing the air cleaner assembly 1 to equipment such as a truck, will be positioned.

Referring to FIG. 1B, in portion 16 of body member 8, housing 2 includes a plurality of traps or indents 17. The traps or indents 17 are generally rectangular (in top plan view) and are defined by rings 14 and side extensions 18. The indents 17 are positioned to selectively receive portions of a mounting bracket, as described below, during mounting of the air cleaner assembly 1. As a result of interlock between portions of the mounting bracket and the traps or indents 17, air cleaner assembly 1 can be easily secured in a selected rotational position relative to equipment on which it is mounted. That is, engagement between the indents 17 and the mounting bracket prevent rotation of the air cleaner assembly 1 relative to the mounting bracket and/or the equipment.

Figure 16:
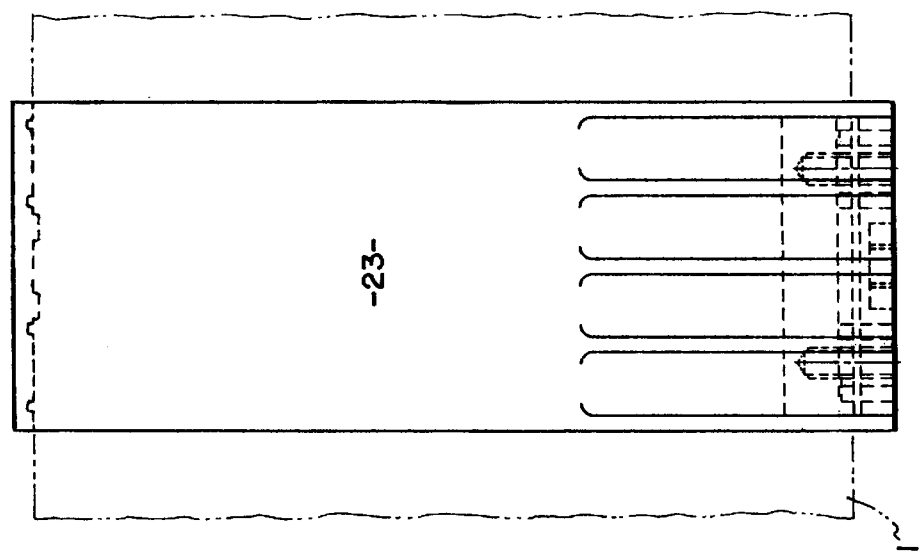
FIG. 16 is a side elevational, partially fragmented, somewhat schematic, view of the mounting bracket of FIG. 15 engaging an air cleaning housing of the present invention.
Figure 15:
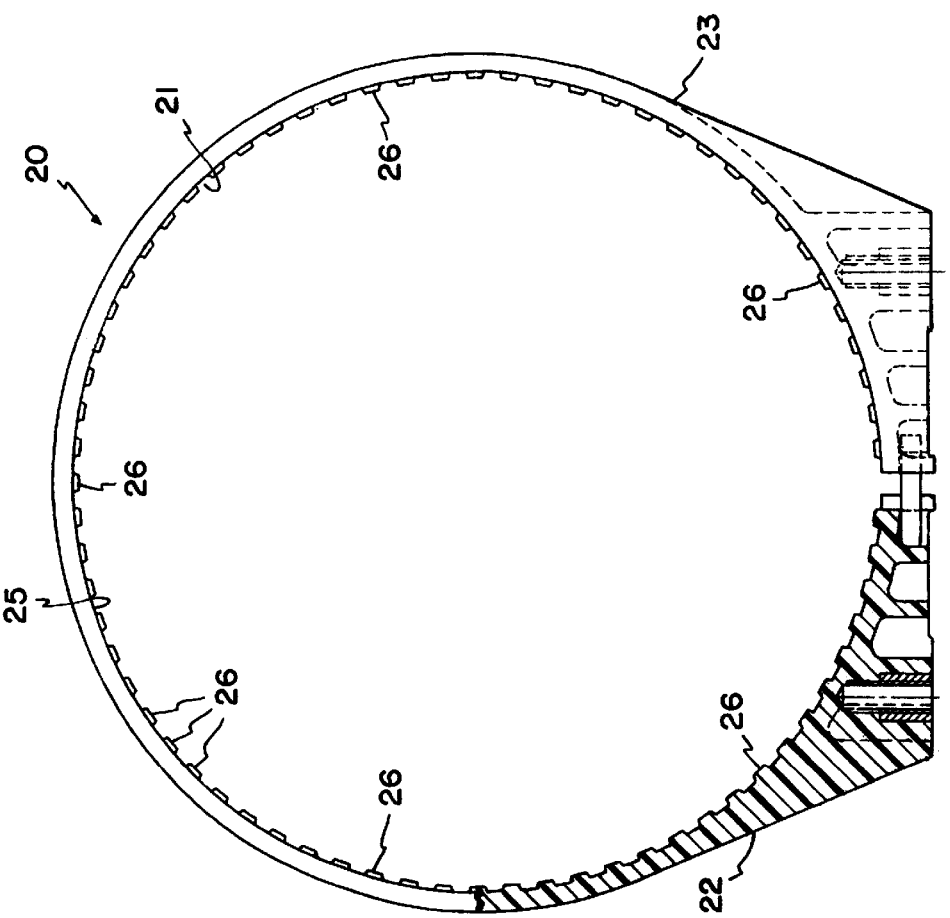
FIG. 15 is a front side elevational, partially cross-sectional, view of a mounting bracket usable with an air cleaner housing according to the present invention.

Attention is now directed to FIGS. 15 and 16. In FIGS. 15 and 16, a mounting bracket 20 (having open interior 21) usable with an air cleaner assembly 1 according to the present invention as depicted in FIG. 1A, is shown. The mounting bracket 20 has an arched configuration with legs 22 and 23 defining open interior 21. In use, the legs 22 and 23 are spread open and air cleaner assembly 1 is positioned to extend through interior 21. The mounting bracket 20 includes an interior surface 25 having detents 26 thereon. A desired rotational orientation between the air cleaner assembly 1 and the mounting bracket would be selected. Detents 26 would then be positioned to engage selected ones of traps or indents 17 in the air cleaner assembly, to achieve the desired rotational configuration. The mounting bracket 20 is readily secured to a vehicle, for example, through bolts or other suitable fastening arrangements.

A mounting bracket analogous to the one described herein is described in detail in U.S. Pat. No. 5,545,241, the complete disclosure of which is incorporated herein by reference.

Figure 3:
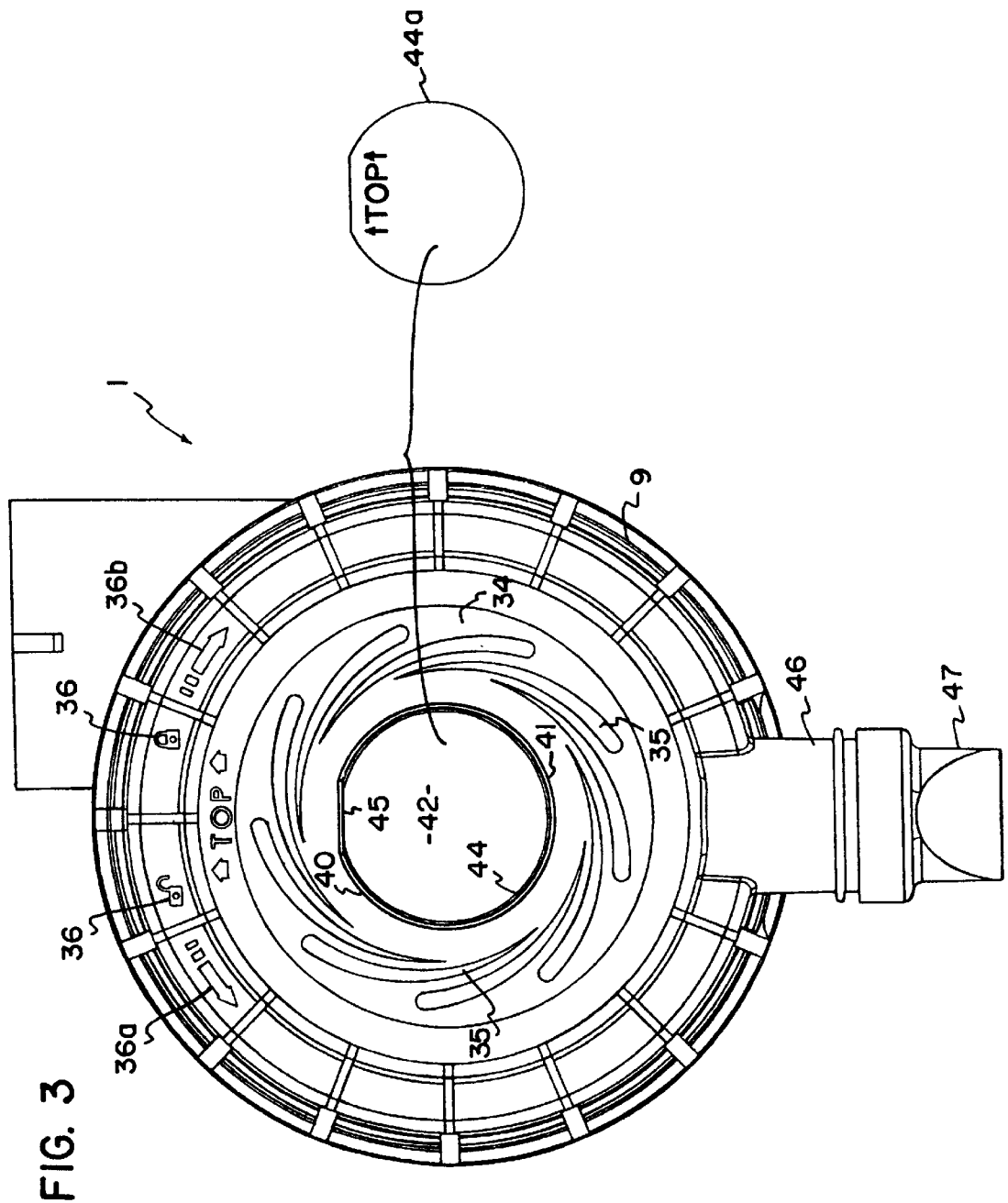
FIG. 3 is a right side elevational view of the air cleaner housing of FIG. 1A, and depicting certain ornamental features on the housing cover.

Attention is now directed to FIG. 3, in which a right side elevational view of assembly 1 is depicted. In FIG. 3, exterior end surface 34 of cover 9 is viewable. At 35, a distinctive swirl figure molded into cover 9 is shown. The swirl figure 35 serves no utilitarian function in connection with filtering operation of the assembly 1, but rather provides for a distinctive appearance. It is noted that, in the preferred embodiment shown, end surface 34 extends as a cover to the end of the housing and has no apertures therethrough.

Also shown in FIG. 3 on an exterior of end surface 34 of cover 9 is molded certain indicia 36. The molded indicia 36 provides instruction in connection with a service operation to be formed on air cleaner assembly 1. In particular, indicia 36a indicate instructions for moving (rotating) the cover 9 to unlock or disconnect the cover 9 from the body member 8; and, indicia 36b indicate instructions for moving (rotating) of the cover 9 relative to the body member 8 in order to achieve a locking engagement therebetween.

Still referring to surface 34, attention is now directed to molded feature 40. Molded feature 40 comprises a perimeter ridge 41 defining a central flat area 42. Perimeter ridge 41 preferably defines a geometric figure or perimeter which is not "rotationally" symmetric. The particular perimeter 41 depicted is circular in portion 44, but flat at region 45.

It is perceived that, in typical uses, labels (44a) or pad printing will be used to provide information in flat area 42. The lack of circular or rotational symmetry with respect to the configuration of perimeter ridge 41 can be used to help index information location, for example, label position. Labels that would fill flat area 42 circumscribed by perimeter ridge 41, would need to be noncircular (and non-radially symmetric) to fill the area. Thus, the information could be indexed relative to a flat edge of the label, for securing the label to the cover 8. It is anticipated that typically the information would be printed on the label in a position, relative to flat edge, so that after assembly on a vehicle, the information will appear substantially upright to a reader. As an example, a label 44a with the word "top" and direction arrows is shown. An installer would know to position the air cleaner 1 on a vehicle with the arrows pointed generally up.

For the arrangement shown, circular section 44 extends through a radius of 35 mm, with flat area 42 defining a chord 45 extending under a 35°–55°, preferably, a 45° arc.

Figure 2:
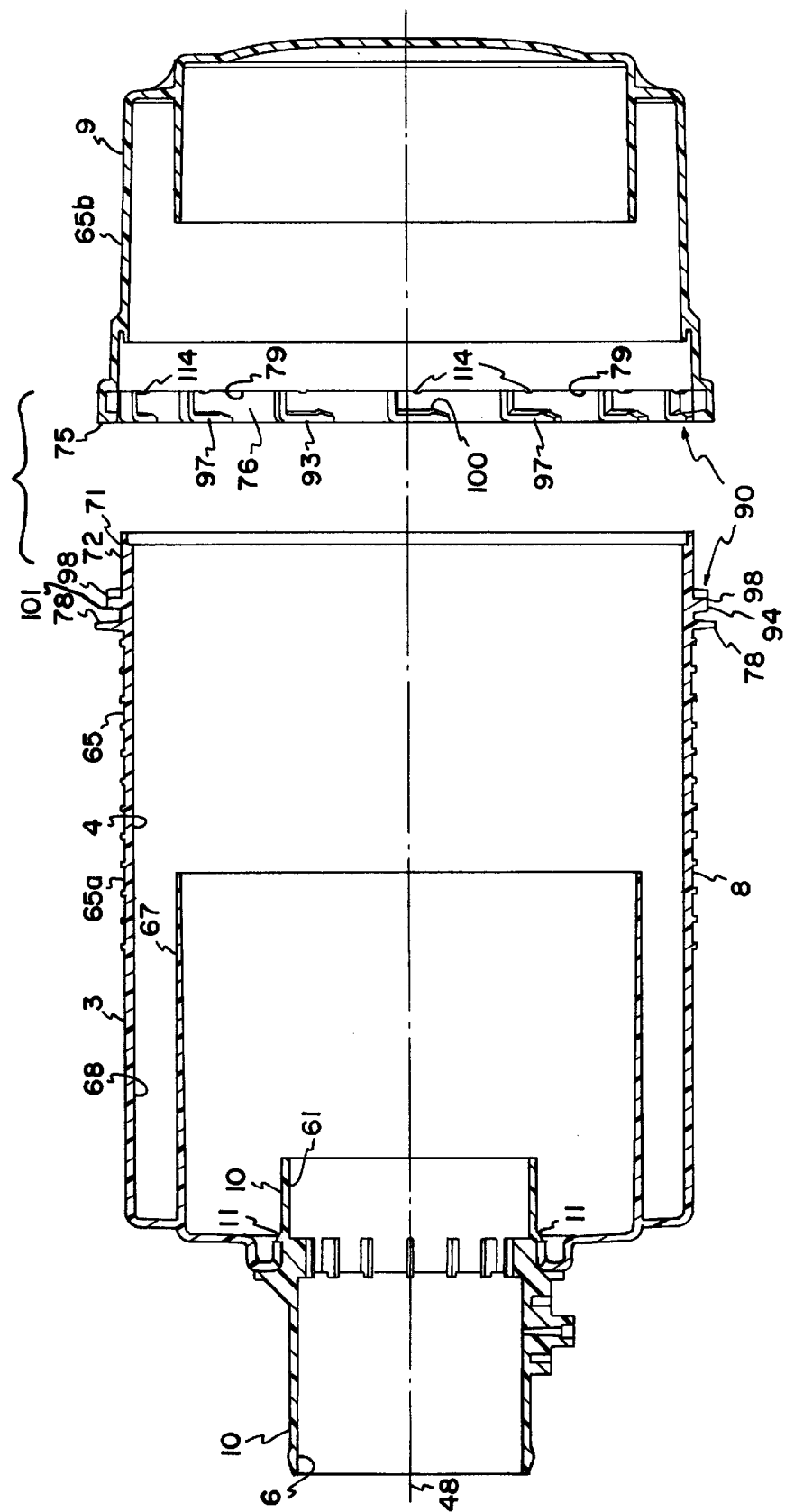
FIG. 2 is an exploded, cross-sectional view of the air cleaner housing depicted in FIG. 1A, taken and shown generally along line 2—2 without any internal filter element assembly therein.

The one reason why appropriate rotational positioning of the air cleaner assembly 1 can be important will be understood by reference to FIG. 1. In FIG. 1, cover 9 is shown having a particulate exhaust tube 46 thereon. Exhaust tube 46 is provided with an exhaust cover 47. In general, it is preferred that the exhaust tube 46 be directed downwardly, so that as particulate material collects within cover 9, it can be readily expelled outwardly and downwardly through tube 46. Exhaust tubes generally of the type shown in FIG. 1 are known, see for example U.S. Pat. No. 5,545,241 incorporated herein by reference. It is noted that the particular design of the tube 46, FIG. 1, differs from those of the U.S. Pat. No. 5,545,241 patent in that the tube 46 extends orthogonal (at a 90° angle) relative to longitudinal axis 48. The tube of U.S. Pat. No. 5,545,241 extends outwardly from the housing at an acute angle relative to the longitudinal axis (i.e. at an angle of less than 90°). The approximately 90° or orthogonal extension of tube 46, FIG. 1, was selected for convenience. It is noted that exhaust tubes are optional and may not be used in some applications of the invention.

As indicated previously, for the particular arrangement shown, outlet tube 10 is a separate piece from a remainder of housing 2, and is snap fit into body member 8. The particular outlet tube 10, depicted has a "straight" axial extension. That is, in passage through outlet tube 10 air leaving housing 2 moves in the direction of longitudinal axis 48. The snap fit results from annular bead or rib 11, FIG. 2.

Figure 12:
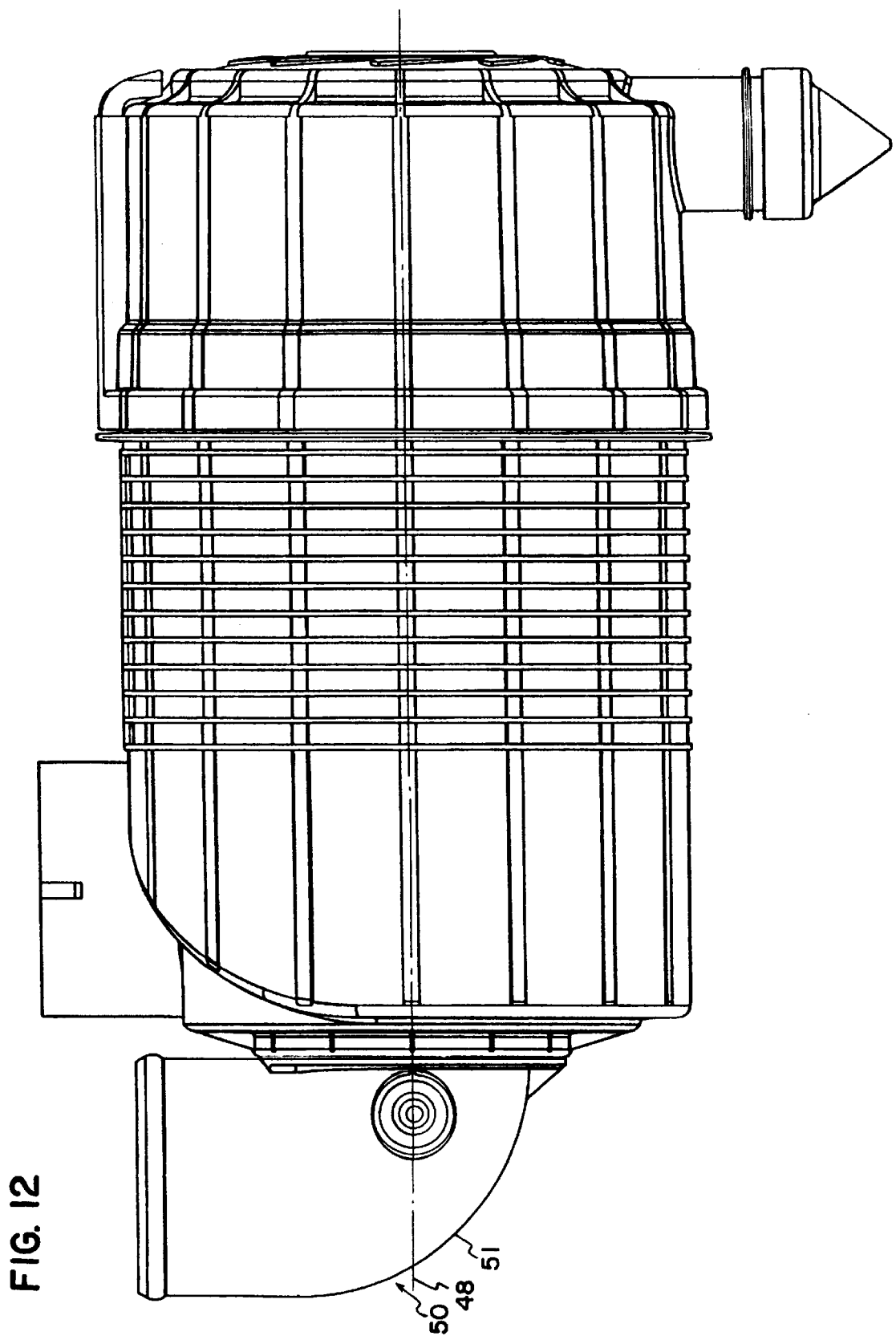
FIG. 12 is a front side elevational view of a third embodiment of a housing for an air cleaner, analogous to that shown in FIGS. 1A and 8.
Figure 13:
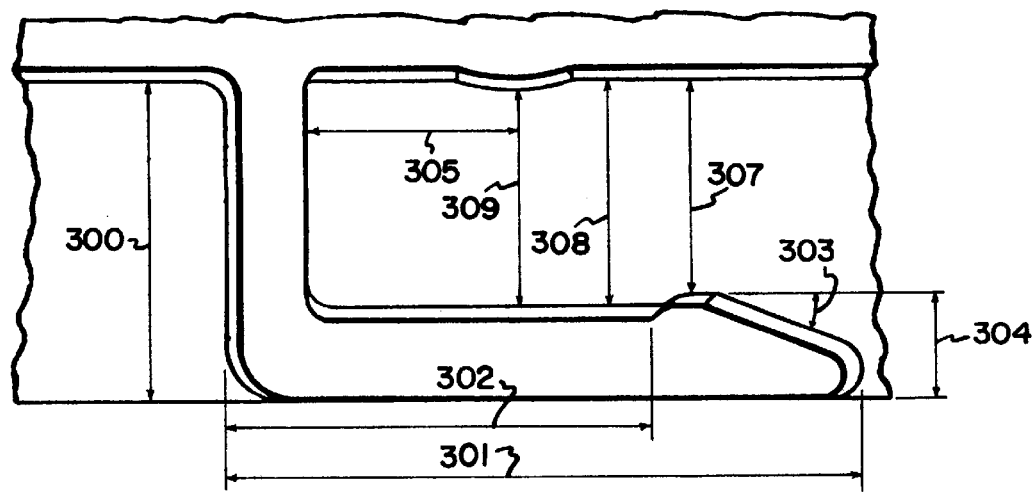
FIG. 13 is an enlarged, fragmented, side elevational view of a socket or foot arrangement useable in embodiments of the present invention, and depicting certain dimensional lines.
Figure 14:
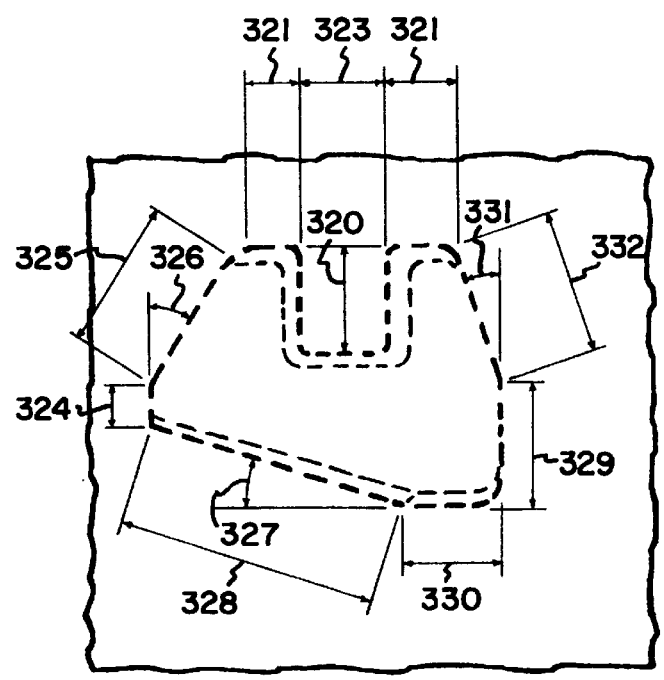
FIG. 14 is an enlarged, fragmented, somewhat schematic, side elevational view of a lug or holder useable in the embodiments of the present invention, and depicting certain dimensional lines.

In FIG. 12, an alternate outlet configuration to those is shown at 50. Outlet tube 50 is a "90° exit" tube. It can be seen that if outlet 50 is positioned in place of outlet tube 10, air exiting housing 2 will first move in the direction of axial line 48 and then will be turned, as a result of bend 51, through a 90° turn. It is noted that the arrangement of FIG. 12 includes other optional modifications to the assembly of FIG. 1, as discussed below.

Although a variety of alternate configurations may be used, it is foreseen that for typical applications and convenient attachment of downstream tubes and other equipment, either a straight tube configuration as shown in outlet tube 10, or a 90° bend outlet tube 50, will be used. By utilization of appropriately molded snap fit configurations, assembly 1 can be configured as either one. That is, typically the features of body member 8 and cover 9 would be the same, regardless of which type of outlet tube, i.e. outlet tube 10 or outlet tube 50, is used.

Figure 4:
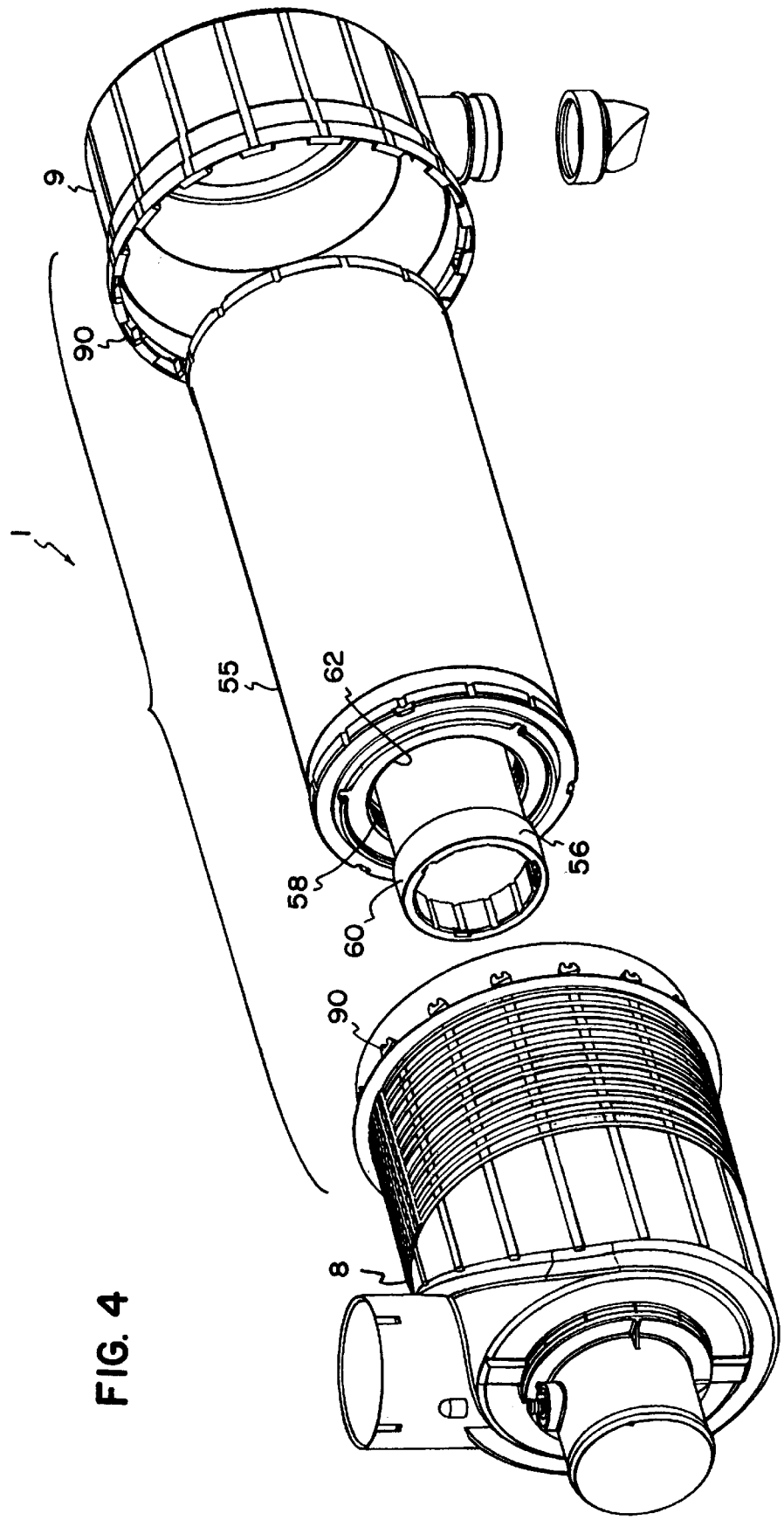
FIG. 4 is an exploded, perspective view of the air cleaner of FIG. 1A, and depicting an internal filter assembly therein.

Attention is now directed to FIG. 4. In FIG. 4 an exploded perspective view of air cleaner assembly 1 is depicted. Attention is directed to internally received filter element 55 and safety element 56. Although a variety of filter element configurations and safety element designs may be used, the ones depicted in FIG. 4 are typical. It is noted that locking assemblies according to the present invention may also be utilized with air cleaners that do not have safety elements.

The filter element 55 may be of the general type previously sold by Donaldson Co., Inc. of Bloomington Minn., the assignee of the present invention. Such filter elements typically include a Donaldson radial seal feature in region 58. That is, material in region 58 would be compressed against a portion of the outlet tube, during assembly. Certain principles relating to such seals are described in EP 0329659, incorporated herein by reference. For Donaldson Co., it may also be preferred to include indicia on the filter element analogous to indicia 35, FIG. 3, to facilitate recognition of relationship.

Safety element 56 is a conventional safety element such as the type previously sold by Donaldson Co., Inc. Safety element 56 includes, in region 60, an external radial seal. Sealing of safety element 56 in position is accomplished by compressing material in region 60 within the inside of a portion of 61 (FIG. 2) of the outlet tube 10 (50 in FIG. 12). Note that the safety element 56 is sized and configured to be received within an open internal volume 62 of the primary filter element 55 during assembly. Element 55 can be removed without removing safety element 56.

Attention is again directed to FIG. 2. In FIG. 2, no installed element is shown.

Referring to FIG. 2, note that the outer sidewall 65 of housing 2, which in use circumscribes a filter element, is formed in part by body member 8 (i.e. sidewall section 65a) and cover 9 (i.e. sidewall section 65b). That is, portions of the longitudinal extension of sidewall 65 are provided by both the body member 8 and cover 9.

Still referring to FIG. 2, body member 8 includes internal, circular or cylindrical, deflector flange 67. As air enters through inlet 5, FIG. 1, it is directed, in part, against deflector flange 67. Preferably, inlet 5 is oriented "tangentially", so that as air is directed against deflector flange 67, it is directed in a circular helical or cyclonic pattern along inside 68 of sidewall 65. To facilitate development of a "cyclonic" pattern, body member 8 includes internal ramp 69 (FIG. 1) therein. Features such as deflector flange 67 and internal ramp 69 have been used in previously existing Donaldson air cleaner systems, such as shown in U.S. Pat. No. 5,545,241 incorporated herein by reference.

Still referring to FIG. 2, sidewall section 65a of body member 8 includes end portion 71. End portion 71 has a ring configuration defining surface 72.

Similarly, sidewall section 65b of cover 9 includes end portion 75 with ring surface 76. During assembly, ring surface 76 engages or faces ring surface 72. Herein, ring surface 76, which is generally cylindrical in configuration, will sometimes be referred to as the "body member engaging surface" of end portion 75 (or cover 9); and ring surface 72, which is also generally cylindrical in configuration, will sometimes be referred to as the "cover engaging surface" of end portion 71 (or body member 8). For the particular arrangement shown, during assembly, ring surface 76 circumscribes ring surface 72 in opposed or juxtaposed or overlapping orientation, spaced sufficiently for positioning of portions of a locking assembly, described below, therebetween.

Sidewall section 65a further includes radial flange or projection 78 thereon. Flange 78 is directed radially outwardly from surface 72 preferably orthogonal to axis 48. Flange 78 provides a stop to movement of end 75 over body member 9 during closure. Flange, or shoulder 79 provides an analogous stop since it will be abutted by holders 98 as described below.

The Locking Assembly

Attention is now directed to FIGS. 2 and 5–7. According to the present invention, the air cleaner assembly 1 is provided with a locking assembly 90. The locking assembly provides for a locking engagement between the cover 9 and body member 8, when selected. That is, the locking arrangement has a locked or locking orientation; and, an unlocked orientation. When in the unlocked orientation, the body member 8 and cover member 9 are easily separated from one another by relative axial movement of one verses the other, typically axial movement of the cover 9 away from the body member 8. On the other hand, when the locking assembly 90 is in the locked orientation, separation of the cover 9 from the body member 8 is inhibited. More specifically, axial movement of cover 9 from the body member 8 is prevented; and, preferably, sufficient inhibition to rotational movement between the cover 9 and body member 8 is provided so that unintended separation does not occur.

Locking assembly 90 is configured to operate by movement between the locked and unlocked orientation upon relative rotational movement of the cover 9 with respect to the body member 8. As a result of this configuration, the particular locking assembly 90 of preferred arrangements characterized herein is a "rotation activated" or "rotation actuated" assembly. By the terms "rotation actuated" and "rotation activated" it is meant that operation between locked and unlocked orientations occurs by rotational movement of one or the other of the cover 9 and body member 8 with respect to the other. Typically, when the air cleaner assembly 1 is mounted upon a vehicle, the selected movement will be rotational movement of the cover 9 with respect to the stationary body member 8. That is, the body member 8 will be secured in position by a mounting bracket such as mounting bracket 20 (FIG. 16), and it is the cover 9 which will be rotated and moved to allow access to interior 4 of housing 2 (FIG. 2).

The particular preferred locking assembly 90 depicted is a "lug-and-socket" or "foot-and-holder" locking assembly 91. The foot and holder locking assembly 91 includes a socket or foot portion 93, FIG. 2, and a lug or holder portion 94. For the particular preferred arrangement shown, the socket or foot portion 93 comprises a plurality of radially spaced sockets or feet 97 positioned on the cover 9; and, the lug or holder portion 94 comprises the plurality of radially spaced lugs or holders 98 positioned on the body member 8. The sockets or feet 97 and lugs or holders 98 are preferably configured and oriented with respect to one another for a selected engagement and disengagement upon operation of the locking assembly 90. For the arrangement shown, a lug or holder 98 is positioned for engagement for each one of the feet 97, and vice versa, during locking. Preferably each one of the sockets or feet 97 includes a portion 100 which, in use, locks behind or around a portion 101 of a lug or holder 98. Also, preferably each lug or holder is engaged by a socket or foot. Thus, in preferred systems there are an equal number of holders (lugs) and feet (sockets). Preferred configurations for the sockets or feet 97 and lugs or holders 98 are provided for advantageous operation.

Figure 5:
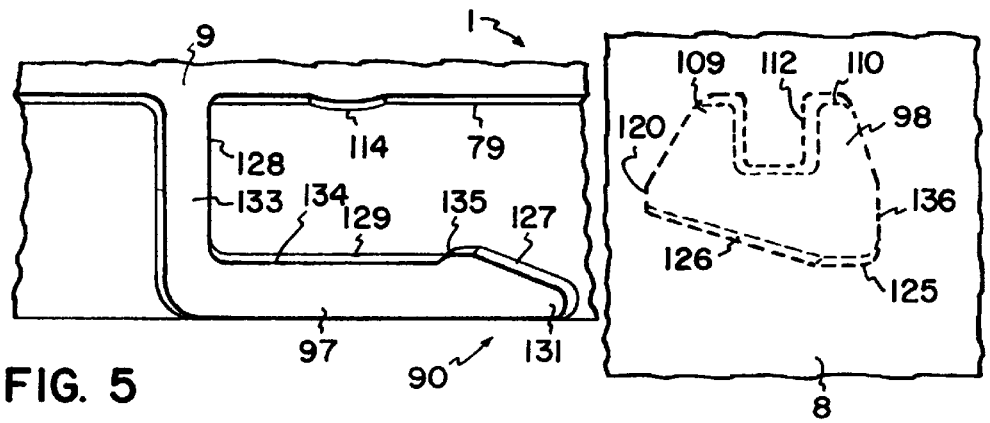
FIG. 5 is a fragmented, enlarged, side elevational, somewhat schematic view of a locking arrangement for the air cleaner housing depicted in FIGS. 1–4, in an unlocked position and prior to engagement.
Figure 6:
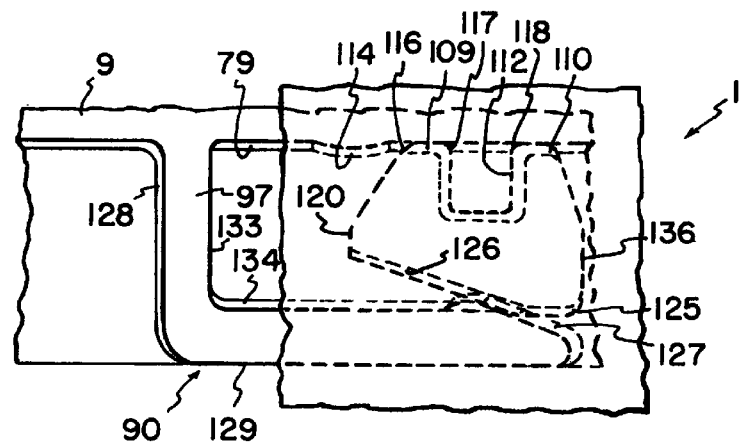
FIG. 6 is a view of the locking arrangement analogous to that shown in FIG. 5, depicting the locking arrangement during engagement.
Figure 7:
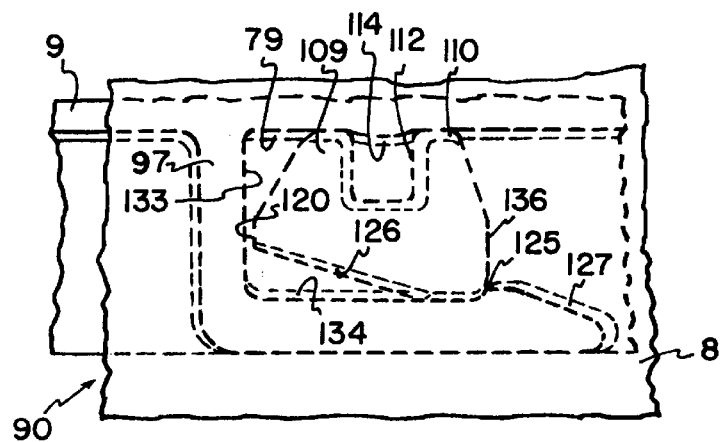
FIG. 7 is a view of the locking arrangement analogous to that shown in FIGS. 5 and 6, depicting the locking arrangement in a locked position and after full engagement.

Attention is now directed to FIGS. 5–7 in which one of the lugs or holders 98 is depicted. In FIGS. 5–7, portions of the lug 98 are shown in broken lines in part because the portions schematically shown are being viewed from an "inside" orientation, i.e. through a portion or flange 72 which has been removed to facilitate examination. Each holder 98 preferably comprises a projection extending radially outwardly from surface 72 (FIG. 2) and spaced from flange 78 (FIG. 2). Each holder 98, FIGS. 5–7, includes a pair of spaced projections 109 and 110 having central concave area, recess, or slot 112 positioned therebetween.

Preferably flange 79, FIGS. 2 and 5–7, includes a plurality of spaced projections, detents or beads 114 thereon; each detent or bead 114 being positioned to align with a corresponding recess or slot 112 in a selected holder 98, during locking engagement. The detents or beads 114 are preferably of a size and shape to project at least partially into slot 112 upon locking, for frictional engagement or resistance to unlocking rotation. Preferred detents or beads, as shown in FIG. 2, are curved bumps in configuration.

Referring again to FIGS. 5–7, the projection 109 includes rounded surface 116 thereon to facilitate engagement with detent or bead 114, during locking; and, rounded surface 117 thereon to facilitate disengagement, during unlocking. A curved surface 118 on projection 110 also facilitates disengagement. Preferred relative configurations of the detent or bead 114 and projections 109 and 110, for a secure engagement, are shown in FIGS. 5–7. Preferred relative dimensions of the parts are described hereinbelow.

Referring still to FIGS. 5–7, lug or holder 98 further includes rear surface 120 thereon. Rear surface 120 is positioned to abut a locking surface, specifically surface 133, of an associated socket or foot 97, during assembly.

Still referring to FIGS. 5–7, adjacent rear surface 120 and extending forwardly toward tip 125, lug or holder 98 includes cammed surface 126. Cammed surface 126 is angled and sized to be readily slid along portion 127 of socket or foot 97, during locking engagement.

Attention is now directed to FIG. 5. In FIG. 5, a socket or foot projection 97 is depicted. The foot projection 97 includes two general sections indicated at 128 and 129. Section 128 provides a back stop at 133 to rotational locking movement. Section 129 projects from section 128 and extends or projects circumferentially. Section 129 is the portion which will be secured around or behind an engaged lug or holder 98, during locking. Thus, during locking, section 129 and bead 114 are located on opposite sides of holder 98. Preferably, the foot projection 97 comprises a molded projection extending out of flange 79. In this context the term "extends or projects circumferentially" and various thereof means that the longitudinal projection of section 129, from section 128, is generally circumferential. That is, section 129 does not substantially project, in longitudinal extension, toward or away from central axis 48, FIG. 2, relative to section 128.

Still referring to FIG. 5, section 129 includes tip 131, ramp or cammed surface 127 and recessed surface 134. Recessed surface 134 extends between section 128 and bump 135. Bump 135 comprises an end of cammed surface 127.

In use, rounded tip 131 is pressed against surface 126 of lug or holder 98, when engagement begins. The surface 126 of holder 98 slides along surface 127 of socket or foot 97, as engagement occurs. Eventually bump 135 of socket or foot portion 97 slides past rear surface 136 of lug or holder 98, at which point lug or holder 98 settles against recessed surface 134, generally secured between bump 135 and section 128 (surface 133). That is, an over-center lock is achieved. Detent 114 or bead is positioned so that when the level of engagement described in the previous sentence occurs, detent or bead 114 is positioned within recess or slot 112. When the parts are configured relative to one another appropriately, the net result of the motion described previously in this paragraph, is a snap fit, over-center, rotational locking engagement between the socket or foot 97 and the lug or holder 98. Unlocking can be readily accomplished by a reverse rotational movement with sufficient force to overcome resistance provided by rounded bump 135 and rounded detent 114.

Motion between locking and unlocking will be understood by reference to the positions indicated in FIGS. 5, 6, and 7. Progression from FIG. 5 toward FIG. 7 is a generally "locking" movement; and, the first movement from FIG. 7 toward FIG. 5 would be unlocking. It can be seen by comparing FIGS. 5, 6 and 7 to FIG. 2, that the positioning which would accomplish the engagement disengagement of FIGS. 5–7 would be a rotational movement of cover 9 relative to body member 8.

It is foreseen that the components should be sized and configured such that in a locked position, FIG. 7, the engagement is snug but not tight. In spite of this, unacceptable levels of "rattling" of the cover 9 on the body member 8, during use, will not occur for typical systems. This is because the filter element 55, FIG. 4, will typically have soft, compressible end cap members and will be oriented in size so as to be lightly compressed, in an axial direction, between the body member 8 and the cover 9. This light compression of the soft, compressible end caps will provide a dampening effect to rattling between the components shown in FIGS. 5–7. Conventional filter elements of the type described previously and available from Donaldson Company are sufficient for this effect.

Preferred dimensions for the various components are described herein below.

It will be understood that in alternate arrangements, the lugs or holders could be positioned on the cover, and the sockets or foot members could be positioned on the body member; or, a mixture of the two could be positioned on each one. However, the arrangement described and shown is convenient and advantageous both for manufacture and assembly.

For the arrangement shown, the holders and foot members are evenly radially spaced upon the body member 8 and cover 9, respectively. The spacing, on center, is about 22.5°, and there are 16 of each member. It is foreseen that variations are useable. Preferably, however, there will be at least 10 lugs or holders and 10 sockets or feet, within air cleaner arrangements of the sizes described herein. Most preferably, each socket (foot) is engaged by a lug (holder) and each lug (holder) is engaged by a socket (foot), during locking. Also, preferably, even radial spacing will be selected, so that specific rotational orientation between the cover 9 and body member 8 is not dictated, to a great extent, by the radial positions of the feet 97 and holders 98. That is, the convenient and secure closure can occur without substantial radial adjustment of the positioning of cover 9 verses body member 8.

In review of FIGS. 2 and 5–7, and the descriptions above, certain advantages to the preferred arrangement disclosed will become apparent. For example, the "locking assembly" could be referred to as "internal." That is, the components that interlock during locking, i.e., the lugs or holders 98, the sockets or feet 97, and detents or beads 14, are oriented such that, when assembled during locking, they are all positioned underneath the cover 9, with no aperture exposing them directly to the environment. That is, when the cover 9 is positioned on the body member 8, the components of the locking assembly identified are positioned underneath an outer surface 65b of the cover member 9, i.e., underneath an outer surface 65 of the housing 2. This means that they are not exposed to the elements. Thus, interference with the locking and unlocking operation due to the environment of use or the elements, for example, snow, ice, road tar, mud, etc., is not likely. Further, they are less likely to become damaged in the environment of use.

Also, the preferred configuration shown does not result in the generation of a substantial twisting or bearing force between the cover and the body member during the locked engagement. That is, there is not a pressure tending to press or twist the cover away from the body member after the locked orientation, FIG. 7. Rather, the lugs or holders 98 rest (and are trapped), over center, in recesses in the sockets or feet 97. This means that portions of the locking assembly, for example, the foot members, are not likely to become twisted, distorted, or sheared due to forces while locked. Alternately stated, the twisting or bearing force occurs briefly during passage over-center, but is relieved in the locked orientation.

Hereinbelow, some preferred dimensions for suggested lugs or holders and sockets or feet are provided. It can be seen that variations from these can be used. In general, the preferred dimensions given are for the preferred arrangement characterized, having an internal dimension of about 8 inches in diameter. Variations from that diameter, if substantial, may justify a proportional modification in certain dimensions of the corresponding lugs or holders and sockets or feet. However, in some applications, maintenance of the same dimensions and proportions, while varying overall diameters of the housing, will be possible. Similarly, if a diameter of the housing is reduced sufficiently, it may be desirable to have a fewer number than 16 of the lugs or holders and sockets or feet. This too will be a matter of design choice and relating to ease of molding and convenience of the sample.

For the preferred embodiment, each of the lugs or holders 98 and sockets or feet 97 is designed for convenient and efficient manufacturing techniques. Preferably, the lugs or holders 98 and sockets or feet 97 are injection molded, together with their respective housing components, i.e., the body member 8 and cover member 9. When injection molding, it is advantageous to include a draft angle on the manufactured components, in order to help demold the components. By "draft angle", it is meant that one of the surfaces of the component being manufactured is recessed or projects away at an angle from an opposite surface of the component being manufactured. In the preferred embodiment, the draft angle is from about 0.5–3 degrees, preferably about 1 degree.

An Engagement Finger (Optional)

Figure 8:
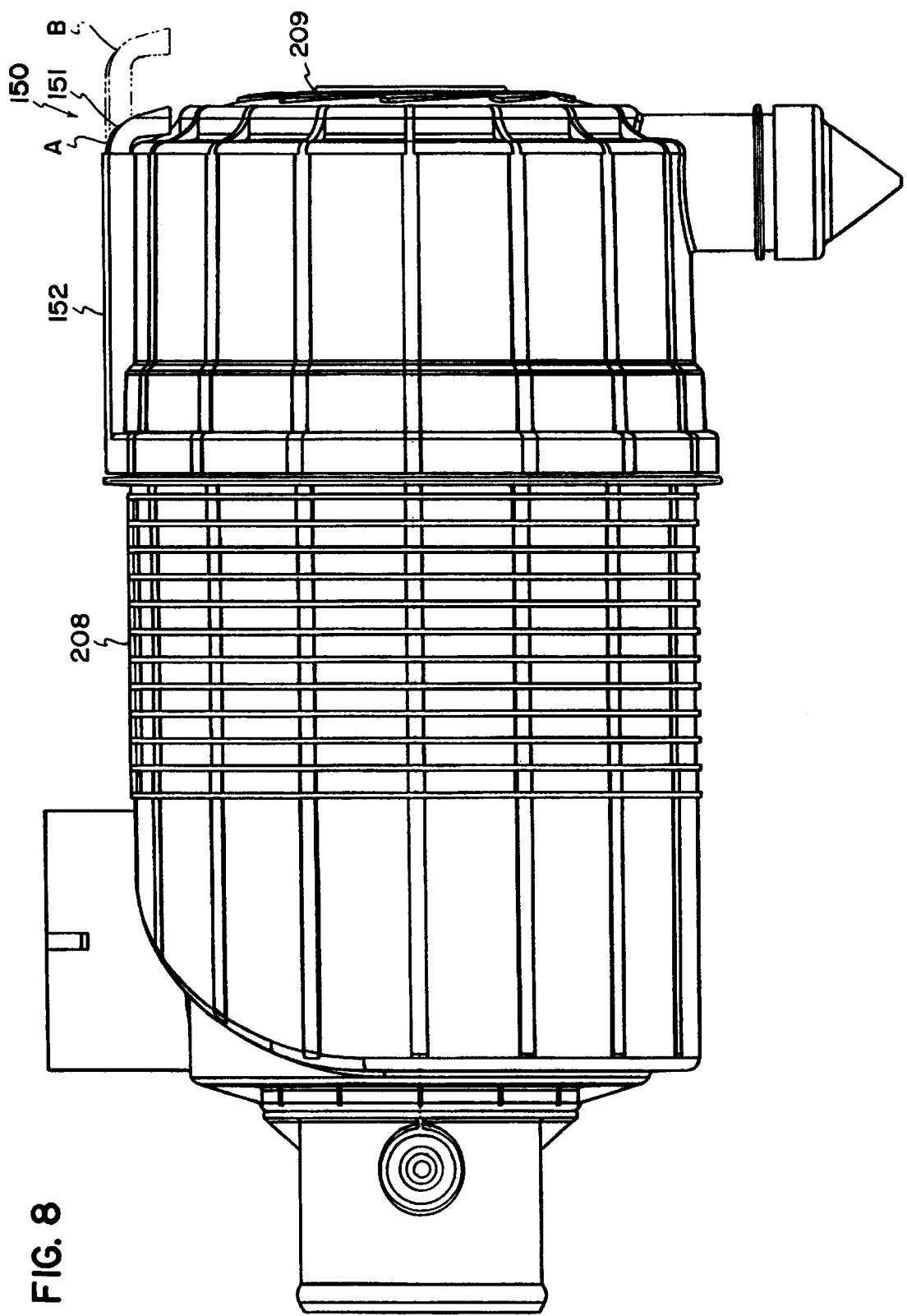
FIG. 8 is a front side elevational view of a second embodiment of a housing for an air cleaner, including a locking finger assembly.
Figure 9:
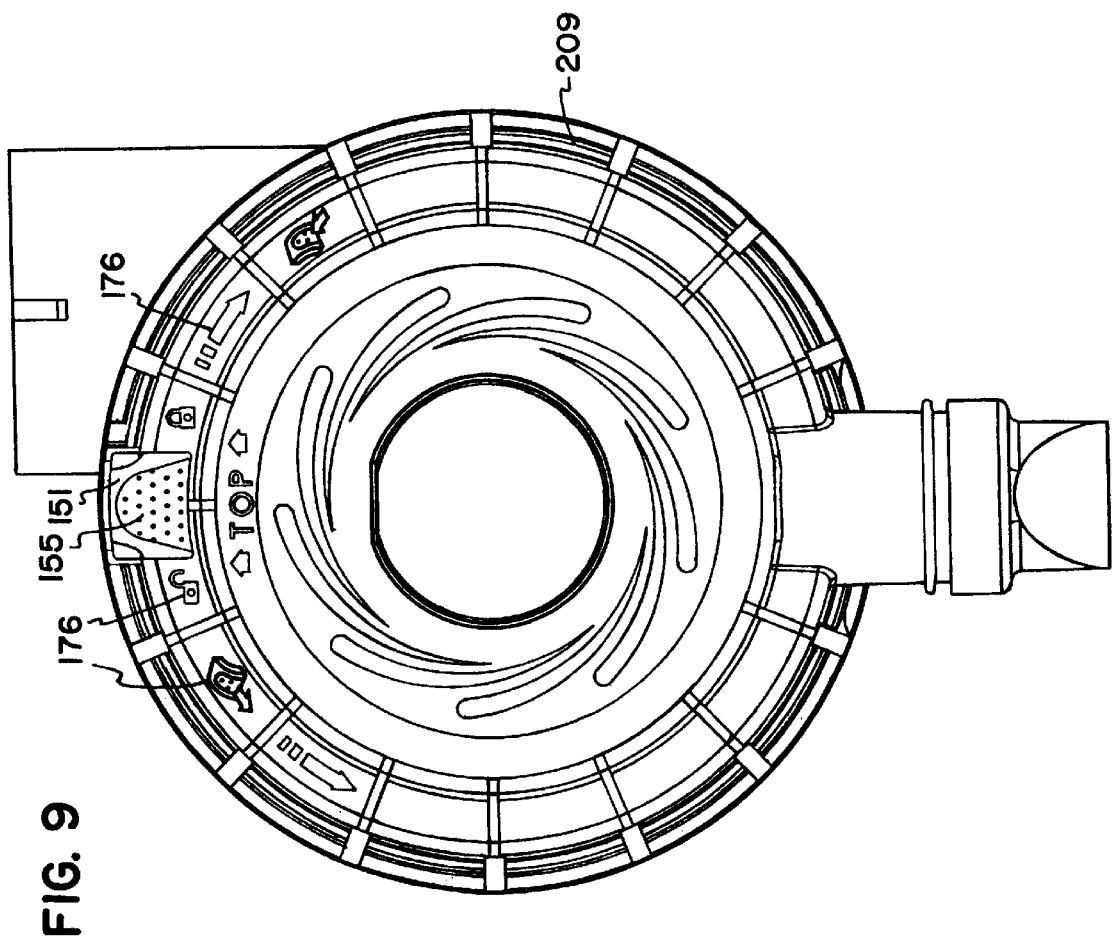
FIG. 9 is a right side elevational view of the air cleaner housing depicted in FIG. 8, and depicting certain ornamentation on the housing cover.
Figure 11:
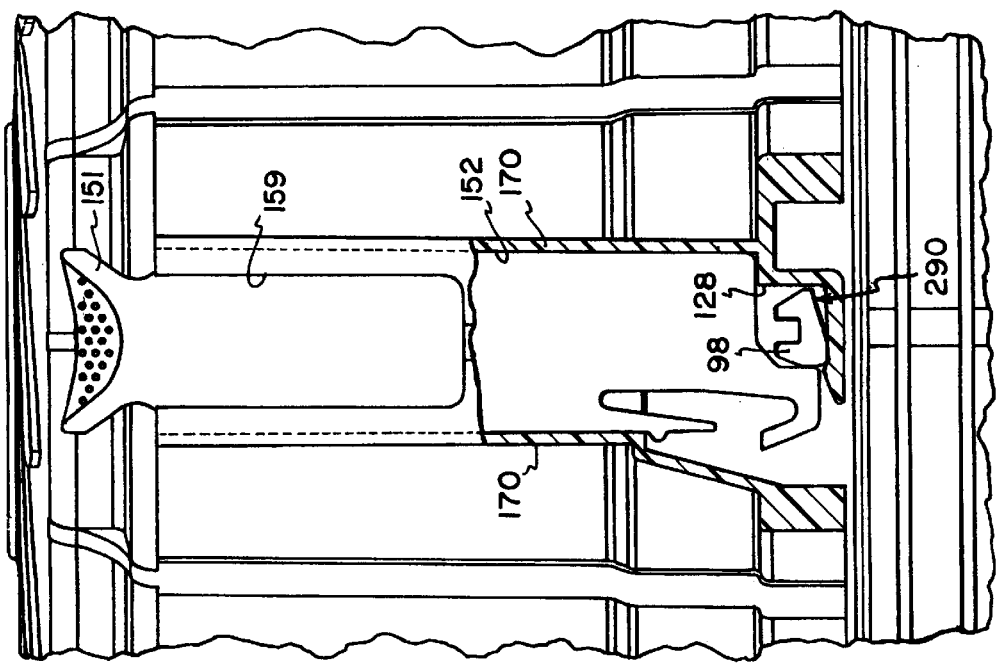
FIG. 11 is a view analogous to FIG. 10, depicting the locking finger in a locked or engaged position and the locking arrangement in a locked position.
Figure 10:
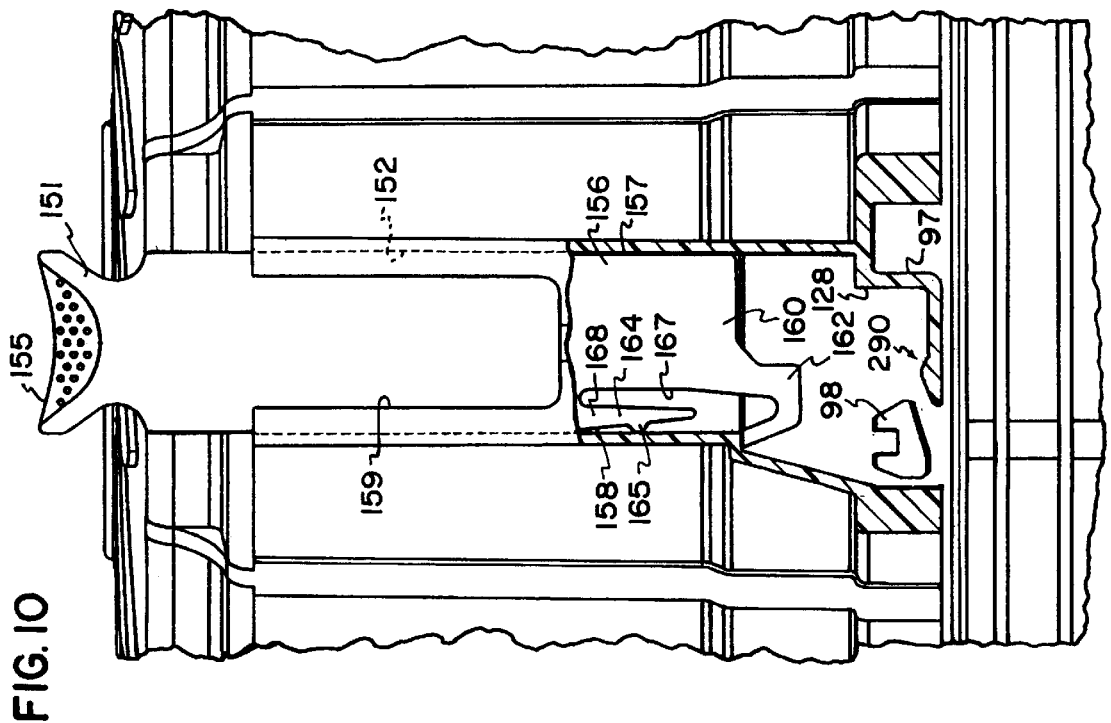
FIG. 10 is a fragmented, enlarged, partial cross-sectional, and somewhat schematic view of the locking finger assembly for the air cleaner housing depicted in FIG. 8, showing the locking finger assembly in an unlocked position and the locking arrangement in an unlocked position.

Attention is now directed to FIGS. 8–11. In FIG. 8, a cover including an optional engagement finger construction thereon is shown. More specifically, the arrangement of FIG. 8 includes an engagement finger assembly 150. The engagement finger assembly 150 includes a slideable engagement finger 151 mounted in slot or track construction 152. In the assembly 150, the slideable engagement finger 151 is readily slideable between two positions: a first, release, position (B); and, a second, engaged, position (A). When the slideable engagement finger 151 is in the release position, the cover 209 can be rotated relative to the body member 208, in order to lock or unlock the lock assembly. When the slideable engagement finger is in the engaged position, rotational movement of the cover 209 relative to the body member 208, in order to unlock or lock the locking assembly 290, FIGS. 10 and 11, is inhibited. In general, in FIG. 8, the slideable engagement finger 151 is shown in the locked orientation at A; and in the unlocked orientation at B.

The engagement finger assembly 150 operates by sliding a portion of the engagement finger 151 to a position on an opposite side of an associated lug or holder 98 from section 128 of an associated socket or foot member 97, FIGS. 10 and 11. Thus, the holder 98 becomes rotationally trapped between the slideable engagement finger 151 and the associated L-shaped foot 97, during engagement. When the slideable engagement finger 151 is slid to the disengaged position FIG. 10, the engagement finger 151 is moved out of the position blocking the rotational movement. Thus, rotational movement to unlock is possible.

Attention is directed to FIGS. 10 and 11. Referring to FIG. 10, the slideable engagement finger 151 includes: handle portion 155; shank portion 156, defined between side edges 157 and 158; and, bottom 160. Projecting from bottom 160 is curved finger extension 162; and projecting from edge 158 is tab 164 with outward bead or projection 165 thereon. Tab 164 and curved finger 162 define bay or recess 167, along a bottom portion 168 of edge 158.

In FIGS. 10 and 11, the finger 151 is shown mounted on the cover 209 within track 152. The wall of the cover 209 includes a U-shaped opening 159. The U-shaped opening 159 provides a window or an open space to allow the finger 151 to be visible. That is, the open space defined by the U-shaped opening 159 exposes a portion of the shank portion 156 to the external atmosphere. The edges of the U-shaped opening cover the track 152.

In operation, engagement finger 151 is slid into slot or track 152 having opposite sidewalls 170 which extend along opposite edges 157 and 158. The length of shank portion 156, relative to track 152, is generally selected so that the curved finger 162 projects beyond track 152 regardless whether the finger 151 is in the engaged or disengaged position.

Typically, finger 151 will be molded from a plastic material such as acetyl copolymer, available under the tradename Ultraform® N2320 from BASF, located at 3000 Continental Drive North, Mount Olive, N.J. 07828. As a result, tab 164 and curved finger extension 162 will flex somewhat. During assembly, then, tab 164 and finger extension 162 will compress slightly as they slide through track 152 and will expand after they exit the open end of the track. Bead or projection 165 will inhibit engagement finger 151 from unintentionally slipping through the track 152 until a force pulling handle 155 is applied.

It may be advantageous to have the finger 151 be a different color from the rest of the housing, to enhance visibility. For example, a yellow finger and a black housing may be utilized.

Preferably, curved finger extension 162 is sized and positioned so that it will extend, during engagement, to a position adjacent a portion of lug or holder 98, FIG. 11, when the slideable engagement finger 151 is in the engaged position. It can be seen that as a result, holder 98 becomes rotationally trapped between curved finger extension 162 and an engaged foot member 97, during locking of the lock assembly and engagement of the engagement finger assembly 150, preventing relative rotation between the cover 209 and the body member 208.

The engagement finger assembly 150 provides security to engagement of the cover 209 on the body member 208. However, it is not a requirement and is perceived as optional. That is, the locking assembly described herein, can be provided with appropriate resistance, to unlock, to ensure engagement, and retention of selected engagement even in the absence of a safety mechanism such as the engagement finger assembly.

Attention is now directed to FIG. 9. In FIG. 9, a right side elevational view of the arrangement shown in FIG. 8 is illustrated. The handle 155 of finger 151 is viewable. It can be seen that the handle 155 can be configured such that construction with respect to operation of the locking assembly is still viewable. Note that the end view shows indicia 176 for operation of the finger 151, as well as indicia for rotational operation of the locking assembly.

Attention is now directed to FIG. 12. FIG. 12 is a front side elevational view generally analogous to FIG. 9, but showing an optional alternate embodiment including curved outlet member 50. As described previously, such a curved outlet member could also be used with the embodiment of FIG. 1.

Specific Preferred Arrangements

In this section, an example is provided of a set of operating materials and specifications. These are intended as an example. A wide variety of alternate materials and sizes can be used.

The arrangement described would be particularly configured for use in a system with the following characteristics: typical air flow rate of about 100–220 CFM (about 2.8–6.2 cubic meters per minute); and typical pressure drop of about 4–8 inches of water (about 100–205 mm of water).

The filter element 55 has an outer diameter of about 135–140 mm, preferably about 138 mm, and an inner diameter of about 75–85 mm, preferably about 81 mm. The element 55 has an overall length of about 320–325 mm, preferably about 322 mm. It is a Donaldson P827653 primary filter element.

The body member 8 has a length of about 260–270 mm, preferably about 267 mm. It has an outer diameter at portion 71 of about 205–215 mm, preferably about 211 mm, and an inner diameter at portion 71 of about 205–210 mm, preferably about 207 mm. Each of the ribs 13 on body member 8 has a width of about 4–8 mm, preferably about 6 mm. There are about 16 ribs 13 on the body member 8. There are about 12 rings 14 on the body member 8, and each of the rings 14 is spaced about 5–15 mm, preferably about 10 mm, from an adjacent ring. Each of the rings 14 has an outer diameter of about 209–212 mm, and a width of about 1–3 mm, preferably about 2 mm. Flange 78 extends a distance of about 7–12 mm, preferably about 9 mm from the sidewall section 65 of the body member 8, and about 30–40 mm, preferably about 34 mm from the bottom of the body member 8 and adjacent to portion 71.

The deflective flange 67 has a length of about 125–135 mm, preferably about 132 mm, and an outer diameter of about 165–175, preferably about 170 mm. The distance between the inner wall of body member 8 and flange 67 is about 15–20 mm, preferably about 17 mm.

The inlet 5 has an outer diameter of about 90–100 mm, preferably about 95 mm. The outlet 6 has an outer diameter of about 85–95 mm, preferably about 89 mm, an inner diameter of about 80–90 mm, preferably about 85 mm, and a length of about 110–120 mm, preferably about 115 mm.

The cover 9 has a length of about 130–140 mm, preferably about 134 mm. At surface 76, the cover 9 has an inner diameter of about 210–215 mm, preferably about 213 mm, and an outer diameter of about 225–230 mm, preferably about 227 mm. There are about 16 ribs 13 on the cover 9.

The exhaust tube 46 has an outer diameter of about 55–60 mm, preferably about 57 mm, and an inner diameter of about 47–52 mm, preferably about 50 mm.

The body 8 and cover 9 are constructed from plastic, such as glass filled polypropylene; available under the tradename Higlass™, from Himont Advanced Materials, located at 2663 Eaton Rapids Road, Lansing, Mich. 44911.

There are a total number of about 16 sockets or feet 97. In reference to FIGS. 5–7 and 13, section 128 has a length 300 of about 12 mm, and a width of about 2–3 mm, preferably about 2.4 mm. Section 129 has a length 301 to end tip 131 of about 21–22 mm, preferably about 21.6 mm and a length 302 to the edge of bump 135 of about 12–13 mm, preferably about 12.3 mm. Section 129 has a width of about 3 mm. Cammed surface 127 is on an angle 303 from a horizontal plane of about 22°. Cammed surface 127 has a length between bump 135 and tip 131 of about 9 mm.

The tip 131 is on a radius of about 0.9 mm. The recessed surface 134 of section 129 is angled about 1° from the planar surface of section 129.

Bump 135 is on a radius of about 1 mm. It has a height 304 from an edge of section 129 of about 3–4 mm, preferably about 3.5 mm.

The middle of detent 114 is at a distance 305 from section 128 of about 7–8 mm, preferably about 7.4 mm. It is on a radius of about 11–12 mm, preferably about 11.5 mm. It projects a distance of about 0.1–1 mm, preferably about 0.2 mm from section 128.

Sockets or feet 97 have a distance 307 of about 8–9 mm, preferably about 8.5 mm from bump 135 to flange 79. It has a distance 308 of about 9 mm between section 129 and flange 79. It has a distance 309 of about 8–9 mm, preferably about 8.2 mm between section 129 and bump 114.

Each of sockets or feet 97 curve along in the inner rim of cover 9 over an angle of about 11–12°, preferably about 11.7°, from outside of section 129 to end tip 131.

There are about 16 lugs or holders 98. In reference now to FIGS. 5–7 and 14, each projection 109 has a length 320 of about 3–4 mm, preferably about 3.5 mm and a width 321 of about 2 mm. Each of projections 110 has a length 320 of about 3–4 mm, preferably about 3.5 mm, and a width 322 of about 2 mm.

The slot 112 has a length 320 of about 3–4 mm, preferably about 3.5 mm, and a width 323 of about 4–5 mm, preferably about 4.2 mm. This defines an area of about 14–15 sq. mm, preferably about 14.6 sq. mm.

The rear surface 120 has a length 324 of about 1–2 mm, preferably about 1.1 mm. The surface between rear surface 120 and curved surface 116 has a distance 325 of about 5 mm. It is angled from the vertical at angle 326 of about 30°.

Camped surface 126 extends at an angle 327 from the horizontal of about 16°. It has a length 328 of about 9–10 mm, preferably about 9.6 mm.

The rear surface 136 has a length 329 of about 4–5 mm, preferably about 4.1 mm.

The distance 330 between tip 125 and cammed surface 126 is about 2–3 mm, preferably about 2.9 mm. The surface between rear surface 136 and projection 110 has a distance 332 of about 4–5 mm, preferably about 4.3 mm, and an angle 331 of about 21°.

The lugs or holders 98 have slanted walls, i.e., a draft angle, which slant at an angle of about 1°. That is, in order to help demold the lugs or holders 98, one of the planar surfaces is recessed or projects away at an angle of about 1° from an opposite planar surface.

The lugs or holders 98 project about 5–6 mm, preferably about 5.5 mm from the exterior surface of the body 8. The distance between the end tip of portion 71 and the rear surface 120 is about 21–22 mm, preferably about 21.5 mm.

Finger 151 has a length from handle portion 155 to an end of extension 162 of about 125–135 mm, preferably about 130 mm. It has a width across shank portion 156 of about 29–30 mm, preferably about 29.6 mm. The tab 164 has a length of about 18–22 mm, preferably about 20 mm, and across its widest portion a width of about 5–6 mm, preferably about 5.4 mm. The bead 165 is on a radius of about 1–2 mm, preferably about 1.5 mm and projects about 1–2 mm, preferably about 1.5 mm from the tab 164. The extension 162 extends a distance of about 1–5 mm, preferably about 3 mm beyond the edge of the track 152, when the finger 151 is in the locked position.

I claim:

1. An air cleaner assembly comprising:
   (a) a body member including a sidewall and an end wall;
      (i) said body member defining an open air cleaner interior and an air flow inlet;
      (ii) said sidewall defining an open end for selected insertion and removal of an air filter element;
      (iii) said body member including a generally cylindrical, cover engagement, surface;
      (iv) said body member being a molded plastic construction;
   (b) an air flow outlet secured to said body member;
   (c) a removable cover sized for selective positioning in covering relation to said sidewall open end;
      (i) said cover including a generally cylindrical, body member-engagement surface, said body member engagement surface being dimensioned to circumscribe said cover engagement surface;
      (ii) said cover comprising a plastic molded member;
      (iii) said body member and said cover defining an interior of a size sufficient to operably receive a cylindrical filter element having a diameter of at least 6 inches;
      (iv) said cover including a ring-shaped wall projection oriented substantially orthogonal to said cylindrical body member engagement surface;
      (A) said cover including a plurality of radially spaced beads positioned on said ring-shaped wall projection;
   (d) a rotation activated lock assembly having a first unlocked orientation and a second locked orientation;
      (i) said cover being separable from said body member when said lock assembly is in said first, unlocked, orientation;
      (ii) said cover being secured to said body member when said lock assembly is in said locked orientation;
      (iii) said rotation activated lock assembly being constructed and arranged to selectively move between said unlocked orientation and said locked orientation by rotational movement of said cover relative to said body member;
      (iv) said cover being selectively rotatably slideable relative to said body member, with said cylindrical cover member engagement surface opposed to said cylindrical body member engagement surface, during selected movement of said lock assembly between said locked and unlocked orientations;
      (v) said rotation activated lock assembly including a foot-and-holder lock arrangement including a foot arrangement and a holder arrangement;
         (A) said holder arrangement comprising at least 10 radially spaced holders positioned on said cylindrical cover member engagement surface of said body member;
         (B) each of said at least 10 radially spaced holders including first and second, spaced, projections with a slot defined therebetween;
         (C) said plurality of radially spaced beads on said ring-shaped wall projection being positioned such that a selected one of said beads is positioned in a selected one of said slots, for frictional engagement, whenever said lock assembly is in said locked orientation;
         (D) said foot arrangement comprising at least 10 radially spaced L-shaped feet positioned to project outwardly from said ring-shaped wall projection and said cylindrical body member engagement surface;
            (1) each one of said L-shaped feet having a second section circumferentially projecting from a first section;
            (2) selected individual ones each of said plurality of holders being positioned for locking engagement by selected individual ones of said second sections of said plurality of L-shaped feet, when said lock assembly is in said locked orientation;
         (E) each holder including a first, elongate, cammed surface on a portion thereof oriented in direction away from a majority of said cover, during locking engagement of said cover on said body member;
            (1) each first elongate cammed surface being engaged by said second section of a selected L-shaped foot member, when said lock assembly is rotated into said second, locked, orientation from said first, unlocked, orientation; and,
            (2) said first cammed surface being positioned to facilitate movement of said lock assembly to said locked orientation; and
   (e) a moveable engagement finger selectively positionable between engaged and release positions;
      (i) said engagement finger, when in said engaged position, being positioned to secure a selected holder between a portion of the engagement finger and a selected L-shaped foot to prevent rotational movement of the holder relative to the L-shaped foot; and, (ii) said engagement finger, when in said release position, releasing a selected rotational movement of the holder relative to an L-shaped foot.

2. An air cleaner assembly according to claim 1 including:
(a) a slide mount on said cover;
  (i) said engagement finger being slideably mounted in said slide mount, for selected movement between said engaged and release positions.

3. An air cleaner assembly according to claim 2 wherein:
(a) said engagement finger includes a spring extension thereon, oriented to retain said finger in said slide mount.

4. An air cleaner assembly comprising:
(a) a housing including a body member and a removable cover;
  (i) said body member including a sidewall;
    (A) said sidewall defining an open end for selected insertion and removal of an air filter element, in use;
    (B) said sidewall defining an air inlet port and an air outlet port;
  (ii) said body member including a cover engagement surface;
  (iii) said removable cover being sized for selective positioning in covering relation to said sidewall open end;
    (A) said cover including a generally cylindrical, body member engagement surface;
(b) a rotation activated lock assembly having a first, unlocked, orientation and a second, locked, orientation;
  (i) said cover being separable from said body member when said lock assembly is in said first, unlocked, orientation;
  (ii) said cover being secured to said body member when said lock assembly is in said locked orientation;
  (iii) said rotation activated lock assembly being constructed and arranged to selectively move between said unlocked orientation and said locked orientation by rotational movement of said cover relative to said body member;
  (iv) said cover being selectively rotatably slideable relative to said body member, with said cylindrical body member engagement surface circumscribing and opposed to said cylindrical body member engagement surface, during selected movement of said lock assembly between said locked and unlocked orientations; and,
(c) a moveable engagement finger movably mounted to said cover and being selectively positionable between engaged and release positions;
  (i) said engagement finger, when in said engaged position, being positioned to block rotation of said cover, relative to said body member, from said locked orientation to said unlocked orientation;
  (ii) said engagement finger, when in said release position, being positioned to permit rotation of said cover, relative to said body member, from said locked orientation to said unlocked orientation.

5. An air cleaner assembly according to claim 4 including:
(a) a slide mount on said cover;
  (i) said engagement finger being slidably mounted in said slide mount, for selected movement between said engaged and release positions.

6. An air cleaner assembly according to claim 4 wherein:
(a) said rotation activated lock assembly comprises a foot-and-holder lock arrangement including; a holder arrangement positioned on a first one of said body member and said cover; said holder arrangement comprising a plurality of radially spaced projections each of which has a cammed engagement surface;
(b) said foot arrangement comprising a plurality of radially spaced feet positioned on a second one of said body member and cover;
  (i) each one of said feet including a cammed engagement surface;
  (ii) said radially spaced feet and said radially spaced holders being positioned and oriented relative to one another such that:
    (A) whenever said lock assembly is in said lock orientation selected ones of said holders are engaged by selected ones of said feet such that at least a portion of each selected foot is positioned along a portion of each selected holder in a manner preventing separation of said body member and said cover, without relative rotation between the cover and body member; and
    (B) whenever said lock assembly is moved from said unlocked orientation, to said locked orientation, by rotation of said cover relative to said body member, said cammed engagement surfaces on selected ones of said feet are rotated toward said cammed engagement surfaces of selected ones of said holders; and, with continual rotation into said locked orientation, at least portions of said cammed engagement surfaces on selected ones of said feet and holders are rotated past one another;
    (C) each of said cammed engagement surfaces, on selected ones of said holders and feet, extending at an oblique angle relative to a direction of rotation of said cover, during operation of said rotation activated lock assembly.

7. An air cleaner according to claim 6 wherein:
(a) said radially spaced feet are positioned on said body member engagement surface of said cover; and,
(b) said radially spaced holders are positioned on said cover engagement surface of said body member.

8. An air cleaner according to claim 7 wherein:
(a) every holder and every foot has a cammed engagement surface.

9. An air cleaner according to claim 6 wherein:
(a) each one of said holders includes a front surface and an opposite rear surface;
  (i) said holders each being positioned such that, when said cover is rotated, relative to said body member, toward said locked orientation:
    (A) said front surface of each holder is located on a side of each holder toward which rotation occurs;
      (i) said front surface including a recessed portion directed at an oblique angle relative to a direction of rotation of said cover during operation of said lock assembly to move between said unlocked and locked orientations.

10. An arrangement according to claim 8 wherein:
(a) the rear surface of each holder includes a portion which is non-parallel to the recessed portion of the front surface of the same holder which extends at an oblique angle relative to said direction of rotation.

11. An arrangement according to claim 9 wherein:
(a) a portion of the rear surface of each holder extends at an oblique angle relative to said direction of rotation.

12. An arrangement according to claim 6 wherein:
(a) said engagement finger first flexible extension defines a wall positioned to extend along said rear surface of one of said holders, whenever said finger is in said locked orientation.

13. An arrangement according to claim 6 wherein:
(a) said foot arrangement and said holder arrangement are each positioned such that, when said lock assembly is in said locked orientation, all feet and holders are positioned underneath at least one of: a portion of said body member; and, a portion of said cover, with no aperture through the housing positioned directly over any of the feet and holders.

14. An arrangement according to claim 6 wherein:
(a) each foot is L-shaped.

15. An arrangement according to claim 6 wherein:
(a) each foot has a non-rectangular outer periphery.

16. An air cleaner assembly comprising:
(a) a housing including a body member and a removable cover;
   (i) said cover including a slide mount thereon; said slide mount defining an arrangement finger mounting slot;
(b) a rotation activated lock assembly having a first, unlocked, orientation and a second, locked, orientation;
   (i) said rotation activated lock assembly being constructed and arranged to selectively move between said unlocked orientation and said locked orientation by rotational movement of said cover relative to said body member;
   (ii) said rotation activated lock assembly including: a holder arrangement comprising a plurality of radially spaced projections positioned on said body member; and, a foot arrangement comprising a plurality of radially spaced projections positioned on said cover member; said cover member being secured on said body member by rotational engagement between said holder arrangement and said foot arrangement, when said lock assembly is in said second, locked, orientation; and,
(c) an engagement finger slideably mounted in said mounting slot of said slide, mount; said engagement finger being selectively slideable between an engaged position and a release position, when said rotation activated lock assembly is in said second, locked, orientation;
   (i) said engagement finger, when selectively slid into said engaged position, being positioned to block rotation of said cover relative to said body member, from said locked orientation to said unlocked orientation; and,
   (ii) said engagement finger, when selectively slid into said release position, being positioned to permit rotation of said cover, relative to said body member, between said locked orientation and said unlocked orientation.

17. An air cleaner assembly according to claim 16 wherein:
(a) said engagement finger includes a first flexible extension thereon, oriented to retain said finger slideably mounted in said slide mount.

18. An air cleaner assembly according to claim 17 wherein:

(a) said first flexible extension is constructed and arranged to project outwardly from said slot with a portion projecting to a position preventing slideable withdrawal of said first flexible extension completely into said slot, during movement of said engagement finger from said engaged position to said release position;
   (i) said first flexible extension being sufficiently flexible for compression to be slid through said slot, during initial installation of said engagement finger in said slot.

19. An air cleaner assembly according to claim 18 wherein:
(a) said engagement finger includes a second flexible extension with a projection bead thereon;
   (i) said projection bead being sized and positioned to project outwardly from said slot, when said engagement finger is in said engaged position;
   (ii) said projection bead being sized and positioned to be withdrawn into said slot, when said engagement finger is in said release position; and,
   (iii) said projection bead being sized and positioned to inhibit unintended movement of said engagement finger from said engaged position to said release position.

20. An air cleaner assembly according to claim 16 wherein:
(a) said rotation activated lock assembly comprises a foot-and-holder lock arrangement including; a holder arrangement positioned on a first one of said body member and said cover; said holder arrangement comprising a plurality of radially spaced projections each of which has a cammed engagement surface;
(b) said foot arrangement comprising a plurality of radially spaced feet positioned on a second one of said body member and cover;
   (i) each one of said feet including a cammed engagement surface;
   (ii) said radially spaced feet and said radially spaced holders being positioned and oriented relative to one another such that:
      (A) whenever said lock assembly is in said lock orientation selected ones of said holders are engaged by selected ones of said feet such that at least a portion of each selected foot is positioned along a portion of each selected holder in a manner preventing separation of said body member and said cover, without relative rotation between the cover and body member; and
      (B) whenever said lock assembly is moved from said unlocked orientation, to said locked orientation, by rotation of said cover relative to said body member, said cammed engagement surfaces on selected ones of said feet are rotated toward said cammed engagement surfaces of selected ones of said holders; and, with continual rotation into said locked orientation, at least portions of said cammed engagement surfaces on selected ones of said feet and holders are rotated past one another;
      (C) each of said cammed engagement surfaces, on selected ones of said holders and feet, extending at an oblique angle relative to a direction of rotation of said cover, during operation of said rotation activated lock assembly.

* * * * *